United States Patent [19]

Nilsson

[11] 4,340,103
[45] Jul. 20, 1982

[54] POROUS TREAD AND METHOD OF MAKING SAME

[76] Inventor: Nils-Åke Nilsson, Erikslundsvägen 348, Täby, Sweden, S-183 44

[21] Appl. No.: 190,766

[22] PCT Filed: Jul. 10, 1979

[86] PCT No.: PCT/SE79/00151

§ 371 Date: Mar. 7, 1980

§ 102(e) Date: Mar. 7, 1980

[87] PCT Pub. No.: WO80/00233

PCT Pub. Date: Feb. 21, 1980

[30] Foreign Application Priority Data

Jul. 10, 1978 [SE] Sweden .................................. 7807694

[51] Int. Cl.³ ........................ B60C 11/00; B29H 17/02
[52] U.S. Cl. ................................. 152/209 R; 156/129; 264/126; 264/326
[58] Field of Search ....................... 152/209 R, 330 R; 156/113, 128, 129, 125; 264/326, 109, 124, 125, 126

[56] References Cited

U.S. PATENT DOCUMENTS 2,575,439 11/1951 Billingsley ...................... 152/209 R
2,960,138 11/1960 Chiodo ........................... 152/209 R
3,386,485 6/1968 Harrison et al. ................ 152/330 R
3,532,147 10/1970 Gough et al. ................... 152/209 R
3,920,604 11/1975 Berg et al. ...................... 152/330 R
4,290,470 9/1981 Williams et al. ................ 152/209 R

FOREIGN PATENT DOCUMENTS 655071 3/1941 Fed. Rep. of Germany .
2502166 7/1976 Fed. Rep. of Germany .
55-47905 5/1980 Japan .............................. 152/209 D Primary Examiner—Michael W. Ball
Attorney, Agent, or Firm—Griffin, Branigan & Butler

[57] ABSTRACT

The invention discloses a vehicle tire with reduced rolling noise emission. The tire tread is provided with one or more air-permeable channels or pores (6), which serve to neutralize air pressure differences between different parts of the tread surface in road contact, for example on each side of a tread block in a tread pattern. The invention also discloses how these channels or pores can be created by piecewise vulcanization of rubber or plastic balls or otherwise shaped rubber or plastic bodies of which the tread is built up so that communicating channels or pores remain between such bodies.

8 Claims, 2 Drawing Figures

POROUS TREAD AND METHOD OF MAKING SAME

BACKGROUND

The present invention concerns a vehicle tire with reduced rolling noise emission and a method for its manufacture.

A considerable environmental problem in todays society is noise emission from roads and streets. At lower speeds and high acceleration, the noise from the power unit dominates at the receiver point in most cases compared to the rolling noise.

At speeds exceeding 50 km/h, however, rolling noise created by the tire contact with the road will dominate. This means that a great portion of the noise problems that exist along streets and roads even in urban areas are caused by tire/road noise. For those areas it would not help much to further reduce the noise emission from the power units. The fact that the tire/road rolling noise dominates the total noise emission for most conditions at speeds exceeding 50 km/h contributes to a certain understandable disinclination of car manufacturers to further reduce the noise emission from the power unit. A reduction of the tire/road rolling noise would thus contribute directly to solve noise problems at streets and highways where speed is higher than 50 km/h and also contribute to a general reduction of the road traffic noise at lower speeds, as reduced rolling noise would increase motivation also for power unit noise reduction. There are mainly three known methods up to now on how to reduce tire/road rolling noise.

1. Changing the tread pattern. The length of different tread blocks is varied in the direction of rotation so that the tonal components of the noise emission is spread around the mean frequency.
2. Changing the rubber compound so that higher compliance is obtained.
3. Influencing the texture of the road surface to obtain an optimal texture depth with respect to noise.

The first method can probably not give any further noise reduction because of an already well developed technique. The tonal contribution to the total noise emission is less dominating for coarse road surfaces, as the random road surface excitation of the tire would dominate noise emission in these cases. The second method can not be used without some increase of tire wear. It gives noise reduction but is not acceptable from an encomical point of view.

Laboratory studies have shown that the most probable cause of the far field tire/road rolling noise at higher frequencies is that tread block oscillations can excite air-resonances in acoustical resonance circuits between the tire and the road surface. A method to prevent this is to allow the air pressure differences in tread cavities to be neutralized through the tread pattern. This can be done by decreasing the tread block sizes and ensure that the air can move in open and communicating channels between the tread blocks. However, if the tread blocks are too small the road holding capabilities will decrease to an unacceptable level. The proposal according to the present invention is in contrary to make the tread blocks in a shape acceptable for road-holding or other requirements but make the entire tread with communicating air channels or pores, for example by using a porous rubber compound. Thereby air-pressure neutralization through the tread block itself can occur while the tread stability is maintained. Due to the porosity the damping characteristics (mechanical losses) of the rubber is increased which is a further advantage with respect to tire/road rolling noise emission. When a tread block is suddenly accelerated and decelerated during road contact, the aerodynamically stored energy is released in form of acoustical energy. If the tread block itself is porous, a part of the energy could be absorbed by the friction losses in the pores and thus not radiated to the surroundings. When the tread surface is made porous the radiated noise to the external far field will be reduced because (1) radiation efficiency will be reduced,
(2) the vibration level in the tread blocks is reduced, and
(3) the stored aerodynamical energy will be absorbed during velocity changes.

An important question is how a tire with a porous tread surface could be manufactured in an enconomical way. There are serveral alternative methods.

A tread could be manufactured by pre-vulcanization. This means that the vulcanization process is not completed. In this pre-vulcanization process the tread is built up by a greater number of rubber granules, for example balls or gravel like parts of a suitable hardness. The rubber granules are allowed to bind together to a certain extent by the pre-vulcanization process. During the tire manufacturing process this pre-vulcanization tread is treated in a normal way, which means that it is put on the un-vulcanized tire carcass and put into ordinary tire vulcanization machine moulds. Thereby the whole tire structure is vulcanized at the same time as a tread pattern is formed in the tread rubber.

As an alternative an un-vulcanized tire carcass can be put into a mould in a vulcanization machine. Thereafter rubber- or plastic-granulate (in form of balls or otherwise shaped rubber fragments) in lose form is poured into the mould. Then the tire is vulcanized into its final shape.

The quantity of rubber granulate and its size distribution is in either case choosen so that a sufficient extent of open pores is obtained.

A side effect of interest from road holding point of view is that the drainage capability of the tire tread surface is drastically increased. Thereby the road grip on a wet road surface is considerably increased. In connection herewith it is worth noticing that the purpose of most tread patterns is to get a sufficient grip on wet road surfaces. On dry surfaces a sufficient grip is obtained with blank or bald tires without any tread patterns at all.

BRIEF DESCRIPTION OF THE DRAWINGS

Two embodiments of the present invention will now be described under reference to the annexed drawings, wherein FIG. 1 in perspective shows a part of a radially sectioned tire according to a first embodiment.

Figure 1:
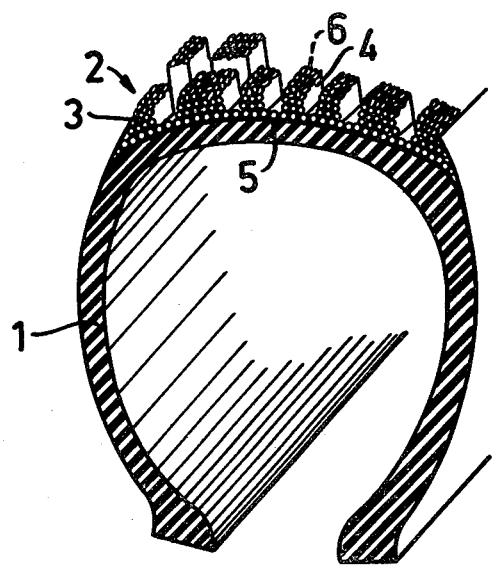
Figure 2:
FIG. 2 shows a part of a cross section through the carcass and tread of this tire.

In the drawings, 1 represents a tire carcass and 2 the tire tread. In the embodiment according to FIG. 1 and FIG. 2 the tread surface consists of a multiplicity of, by vulcanization interconnected rubber or plastic balls or other types of fragments, between which are communicating air spaces as for example air-permeable channels or pores. Of special importance is that air communication is established between a leading 5 and trailing 6 side of tread blocks 4.

I claim:

1. A vehicle tire having a road-contacting portion of tire material adapted for contact with a road surface, said road contacting portion comprising:
   granules of tire material wherein said granules are partially fused together by vulcanization to leave interconnecting pores therebetween;
   said interconnecting pores being operative to permit atmospheric air to flow through said interconnecting pores in said road contacting portion.

2. The tire of claim 1 wherein said granules are comprised of plastic or rubber.

3. The tire of claims 1 or 2 wherein said road-contacting surface includes tread portions having leading and trailing sides thereof; and,
   wherein said interconnecting pores permit said atmospheric air to flow between said leading and trailing sides.

4. The tire of claim 3 wherein said tread portions comprise blocks of tread.

5. A method of manufacturing a vehicle tire of the type having a road-contacting portion of tire material adapted for contact with a road surface, said method comprising the steps of:
   building up said road-contacting portion with granules of tire material; and,
   vulcanizing said granules to partially fuse said granules together, but leaving a multiplicity of air-permeable pores interconnected with each other to thereby permit atmospheric air to flow through said interconnecting pores.

6. The method of claim 5, including the steps of:
   pre-vulcanizing said granules together to form the road contacting portion;
   mounting the thusly built-up road-contacting portion on a tire carcass to form said vehicle tire; and,
   vulcanizing the thusly formed vehicle tire.

7. The method of claim 5, including the steps of:
   pouring loose, unvulcanized granules of said tire material into a mold of a vulcanization machine adjacent an unvulcanized tire carcass; and,
   thereafter vulcanizing said tire material and carcass to form said vehicle tire.

8. The method of claim 5 or 6 or 7, wherein said granules of tire material are comprised of rubber or plastic.

* * * * *